(12) United States Patent
Roberts et al.

(10) Patent No.: US 7,680,905 B1
(45) Date of Patent: Mar. 16, 2010

(54) METHODS AND SYSTEM FOR VIEWING SAN RESOURCES

(75) Inventors: Ethan D. Roberts, Natick, MA (US); Michaell A. Galvin, Foxboro, MA (US); Norris V. Li, Newton, MA (US); Jeffrey S. Phillips, Northbridge, MA (US)

(73) Assignee: EMC Corporation, Hopkinton, MA (US)

( * ) Notice: Subject to any disclaimer, the term of this patent is extended or adjusted under 35 U.S.C. 154(b) by 1202 days.

(21) Appl. No.: 11/240,003

(22) Filed: Sep. 30, 2005

(51) Int. Cl.
*G06F 15/177* (2006.01)
*G06F 17/30* (2006.01)
*G06F 17/00* (2006.01)
*G06F 15/173* (2006.01)
*G06F 15/16* (2006.01)
*G06F 3/048* (2006.01)

(52) U.S. Cl. .................. 709/220; 707/3; 707/103 R; 709/226; 709/229; 715/764; 715/853; 715/736

(58) Field of Classification Search .................. 709/220, 709/223, 225; 715/764, 853, 736; 707/3, 707/103 R
See application file for complete search history.

(56) References Cited

U.S. PATENT DOCUMENTS

| | | | |
|---|---|---|---|
| 6,538,669 B1 * | 3/2003 | Lagueux et al. | 715/764 |
| 6,839,750 B1 * | 1/2005 | Bauer et al. | 709/223 |
| 6,947,950 B2 * | 9/2005 | Murthy et al. | 707/103 R |
| 7,475,363 B1 * | 1/2009 | Yehuda et al. | 715/853 |
| 7,506,040 B1 * | 3/2009 | Rabe et al. | 709/223 |
| 7,555,719 B1 * | 6/2009 | Yehuda et al. | 715/736 |
| 2003/0182422 A1 * | 9/2003 | Bradshaw et al. | 709/225 |
| 2004/0068491 A1 * | 4/2004 | Iline et al. | 707/3 |

* cited by examiner

*Primary Examiner*—Joseph E Avellino
*Assistant Examiner*—Kiet Tang
(74) *Attorney, Agent, or Firm*—Chapin IP Law, LLC

(57) ABSTRACT

A user selects one or more storage area network resources for purposes of viewing respective configuration information. Based on a respective selection by the user, a management control system determines whether it maintains corresponding configuration information associated with the selected one or more resources. If so, the management control system generates a respective configuration view for the user to view respective configuration information associated with the selected one or more resources. If not, the management control system identifies a remote server that manages the selected one or more resources and communicates with the remote server to convey a configuration view generated by the remote server through the management control system to the user for viewing on a display screen. Thus, the management control system can either serve the requested configuration information to a client or act as a proxy for retrieving and serving the requested configuration information to the user.

15 Claims, 10 Drawing Sheets

METHODS AND SYSTEM FOR VIEWING SAN RESOURCES

RELATED APPLICATION

This application is related to earlier filed United States Patent Application entitled "METHODS AND SYSTEM FOR INTEGRATING SAN SERVERS," Ser. No. 11/233,292 filed on Sep. 22, 2005, the entire teachings of which are incorporated herein by this reference.

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Data storage system developers have responded to the increased need for storage by integrating high capacity data storage systems, data communications devices (e.g., switches), and computer systems (e.g., host computers or servers) into networks called "storage networks" or "Storage Area Networks" (SANs).

In general, a storage area network is a collection of data storage systems that are networked via a switching fabric to a number of host computer systems operating as servers. During operation, the host computers access data stored in the data storage systems on behalf of client computers that request data from the data storage systems. For example, according to conventional techniques, upon receiving a storage access request, a respective host computer accesses a large repository of storage through the switching fabric on behalf of the requesting client. An access can include a read or write of data to storage. Typically, many clients can access data through a host computer. Thus, storage area networks enable clients to access a shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, conventional network management storage applications generate a graphical user interface utilized by a network manager to graphically select, interact with, and manage local or remote devices and associated software processes associated with the storage area network.

Based on use of the graphical user interface in combination with an input device such as a hand operated mouse and corresponding pointer displayed on a viewing screen, a network manager can "click" on managed object icons to manage respective hardware and software entities such as file systems, databases, storage devices, peripherals, network data communications devices, etc., associated with the storage area network. In some storage area networks, a network management station and associated management software allows a network administrator or systems manager (a person responsible for managing the storage network) to allocate and de-allocate resources (e.g., hardware and software resources) in a storage area network. Consequently, the network manager can reconfigure a SAN according to users' respective present needs.

The infrastructure required to support access to data in a storage area network can be quite complex. For example, as discussed above, consider the number of hardware and software components that must work in harmony in order for a user's software application executing on a host computer system to successfully access data stored in a storage array of a SAN. To access such data, the user application provides file system calls or requests (e.g., open, read, write and so forth) to a file system resource presented to the user application by an operating system executing on the host computer system. The file system receives the file system calls and operates to map such file system calls to a series of I/O requests. The operating system on the host computer system then transmits the I/O requests through a host interface device resource, such as an interface card (e.g., SCSI or FibreChannel adapter) having one or more I/O port resources, across an interface cable or networking medium (e.g., in a storage area network implementation) to a front-end adapter interface card resource operating within a high-capacity data storage array of the SAN. The front-end adapter interface card receives the I/O requests and interprets them to identify appropriate data locations within specific storage device resources contained in the storage array.

After the requested data is accessed via the storage devices, respective I/O responses are returned to the user application along an information or data flow path (based on operations and processing functionality provided by each of the aforementioned components and resources) in a reverse direction back to the application on the host computer running the client application. In this way, access to data in a conventional storage area network involves reliance on a proper operation and coordination of a multitude of software and hardware resources in a storage area network to retrieve data from storage and serve the data to a client.

One conventional way to manage a respective storage area network involves use of a management control center (such as a computer station) to maintain storage area network configuration information at a central location of the storage area network. In general, the management control center must keep track of all current configuration settings associated with the storage area network. Upon receipt of a respective query from a network administrator, the management control center serves appropriate views of configuration information to the network administrator. Accordingly, the network administrator can view and modify configuration information associated with the storage area network.

SUMMARY

As discussed, management of a storage area network can be a challenge due to the complex network of resources that must be configured so that the storage area network operates properly for a multitude of different types of users. For example, a storage area network typically includes a multitude of storage area network resources (such as respective resources in a path between a host resource and storage array) working in harmony so that a host resource (e.g., server) of the storage area network can access data from the storage arrays on behalf of requesting clients. In certain cases, when even a single resource in the storage area network is not properly configured in a long chain of respective resources, a client in communication with a host resource of the storage area network may not be able to access data in the storage area network.

As discussed above, one conventional way to manage a respective storage area network involves use of a management control center (such as a computer station) to maintain storage area network configuration information at a central location. Upon receipt of a respective query from a network administrator, the management control center serves appropriate management views of configuration information to the network administrator. One drawback of this conventional way of managing the storage area network is the potential tremendous amount of configuration information that must be continuously collected and maintained by the centrally located management control center. Collection and actual maintenance of the configuration information at a centrally located management control center requires communicating with many different types of hardware and software resources to learn of current configuration settings as well as receive commands from potentially many different sources that modify the configuration information. Accordingly, such a typology does not always scale well when a storage area network is expanded to include additional storage area network resources.

The following disclosure includes several useful embodiments for enabling a user to view and manage resources and/or corresponding configuration information (e.g., via different view mode options) associated with a respective storage area network. For example, techniques herein enable a user (e.g., a network administrator) to select a set of storage area network resources from a resource listing such as a hierarchical tree (or storage area network resources) for purposes of viewing respective configuration information on a user's display screen. In addition to viewing configuration information, a respective user can issue active commands to change storage area network configuration settings.

In a general embodiment, a storage area network includes multiple servers. A resource manager (e.g., a computer, a software application, etc.) in a respective first server supports serving configuration information associated with the storage area network. For example, assume that the resource manager in the first server receives a request from a client (e.g., a network administrator) for a configuration view (e.g., view of configuration information) associated with a selected set of storage area network resources (e.g., one or more resources). Thereafter, the resource manager identifies whether configuration information associated with the selected set of resources is managed locally or is managed by a remote server in the storage area network. If the selected set of resources and corresponding configuration information is managed by a remote server, the resource manager communicates with the remote server over a respective network connection to retrieve and forward a requested configuration view from the remote server to the requesting client. Thus, in one embodiment, the resource manager (in the first server) acts as a proxy for serving configuration views from the second server to the clients. This alleviates clients, which are already in communication with the first server, from having to directly communicate with the second server to retrieve configuration information and corresponding configuration views.

In further embodiments, the resource manager in the first server (e.g., an integrated server) maintains a hierarchical tree of resources associated with the storage area network. Certain portions of the hierarchical tree correspond to resources that are managed locally by the resource manager (or first server such as an integrated server) while other portions of the tree correspond to resources and/or corresponding configuration information maintained by respective remote servers over a network.

One embodiment herein involves distributing respective duties of maintaining configuration information amongst multiple remote processes while maintaining a "global" hierarchical tree at a respective integrated server of a storage area network. For example, each of the remote server processes in the storage area network can facilitate management of its own respective portion of the global hierarchical tree and corresponding storage area network resources. In one embodiment, business logic residing at a respective remote server enables a user to change a configuration associated with a corresponding set of managed resources (e.g., managed objects) managed by the respective remote server. Thus, in one sense, configuration management tasks are distributed throughout a respective storage area network because respective remote server processes at different sites independently manages their own portion of storage area network resources.

As a separate entity with respect to the remote servers, a the main server (i.e., integrated server) collects and plugs respective (remotely generated and maintained) hierarchical trees associated with each of the remote processes (e.g., remote servers) into the global hierarchical tree. Thus, the main server or so-called integrated server keeps track of at least a listing of all storage area network resources even though it does not directly manage all such resources. For example, the integrated server does not include software code such as business logic to modify configuration information associated with the set of resources managed by the respective remote servers (e.g., standalone servers of the storage area network). Instead, the business logic for managing the remotely managed resources resides at the respective remote servers. Via maintenance of the global hierarchical tree, the integrated server is at least aware of which other remote servers independently manages which respective storage area network resources. However, the integrated server is not burdened with having to keep manage all storage area network resources since such a task is at least partially handled by one or more remote servers.

Even though the resource manager at the integrated server does not locally manage all of the storage area network resources, the resource manager can initiate display of the global hierarchical tree for a network administrator (e.g., at a browser) to make a selection of storage area network resources. For example, the resource manager can generate a management view such as an interactive graphical user interface for purposes of enabling a respective network administrator at a browser on a respective remote display screen to select from the hierarchical tree and view different configuration information associated with the storage area network.

In response to receipt of a selection of a set of resources from the global hierarchical tree and selection of a corresponding view mode for viewing configuration information associated with the set of one or more resources, the resource manager of a local server (e.g., the integrated server or main server) fulfills a respective request for a configuration view (e.g., configuration information) in different ways depending on whether the configuration view corresponds to a portion of the hierarchical tree maintained locally by the resource manager or a portion of the hierarchical tree maintained by a respective remote server. For example, if the network administrator selects from a portion of the hierarchical tree of storage area network resources maintained locally by the integrated server, the resource manager executes local business logic to generate and serve respective one or more configuration views to the network administrator. Thus, business logic for managing the storage area network resources managed by the so-called integrated server resides locally at the integrated server. Alternatively, if the network administrator requests to view configuration information based on resources from a portion of the global hierarchical tree that is not maintained locally by the integrated server, the resource manager at the integrated server identifies which of multiple respective servers in the storage area network manages the respective data and thereafter acts as a proxy to retrieve and present a respective remotely generated configuration view to the network administrator. In other words, the integrated server can pass requests for configuration views directly to the respective remote server that manages such resources. The remote server executes respective business logic and forwards the requested view to the integrated server that, in turn, forwards the view to the requester.

Note that a user viewing a configuration management view can issue modification commands with respect to the resources managed by a remote server. For example, when a user initiates an active command (e.g., forwards an active command to the integrated sever) to modify configuration information associated with one or more resources managed by the remote resource, the integrated server acts as a proxy for passing the active commands to the respective remote server. In turn, the respective remote server executes appropriate business logic to carry a command (e.g., a change to configuration information) received from the integrated server. If execution of the active command at the remote server results in a corresponding change to a configuration view, the remote server forwards the new configuration view to the integrated server. As discussed, the integrated server then acts as a proxy to forward the configuration view to the user.

Techniques herein are well suited for use in applications such as management of storage area networks and specific applications as discussed herein. However, it should be noted that configurations herein are not limited to use in such applications and thus configurations herein and deviations thereof are well suited for other applications as well.

Other examples of the present application include a computerized device (e.g., a host computer, workstation, etc.) configured to support the aforementioned method operations disclosed herein as embodiments of the present disclosure to facilitate viewing of configuration settings (e.g., configuration information) associated with a storage area network. In such embodiments, the computerized device such as a management control center includes a memory system, a processor (e.g., a processing device), a display, and an interconnect. The interconnect supports communications among the display, the processor, and the memory system. The memory system is encoded with an application that, when executed on the processor, produces a process that enables the user to view resources and configure a storage area network.

Yet other embodiments of the present application disclosed herein include software programs to perform the method embodiment and operations summarized above and disclosed in detail below under the heading Detailed Description. More particularly, a computer program product (e.g., a computer-readable medium) including computer program logic encoded thereon may be executed on a computerized device to facilitate execution of a management function (e.g., view mode management) as explained herein. The computer program logic, when executed on at least one processor with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein.

One more particular embodiment of the present application is directed to a computer program product that includes a computer readable medium having instructions stored thereon for supporting management and viewing of configurations associated with a storage area network. The instructions, when carried out by a processor of a respective computer device, cause the processor to perform the steps of: i) receiving a request from a client for a configuration view associated with at least one resource in a storage area network; ii) identifying that respective configuration information associated with the at least one resource is managed by a second server located at remote location over a communication network; iii) communicating with the second server to retrieve the configuration view associated with the at least one resource; and iv) forwarding the configuration view to the client. Other embodiments of the present application include software programs to perform any of the method embodiment steps and operations summarized above and disclosed in detail below.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate the Control Center (ECC) software. Control Center software is manufactured by EMC Corporation of Hopkinton, Mass., USA.

BRIEF DESCRIPTION OF THE DRAWINGS

The foregoing and other objects, features and advantages of the present application will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles and concepts.

DETAILED DESCRIPTION

According to one embodiment herein, a management control system such as an integrated server of a storage area network supports generation of a graphical user interface so that remotely located network administrators can view and manage resources associated with the storage area network via a respective browser. Upon receipt of a request for a configuration view (e.g., an illustration of configuration information) by a network administrator, the management control system determines whether it locally maintains corresponding configuration information associated with the selected set of resources. If so, the management control system generates a respective configuration view for a user to view respective configuration information associated with the selected set of resources. If the management control system does not maintain the corresponding configuration information associated with the selected set of resources, the management control system identifies a remote server (e.g., a remote process of multiple processes existing in a storage area network environment) that manages the selected one or more resources and communicates with the remote server to convey a configuration view generated by the remote server through the management control system to the user for viewing on the user's display screen. Thus, the management control system can either serve the requested configuration information to a client or act as a proxy for retrieving and serving the requested configuration information to the client.

Also, note that a network administrator viewing a retrieved configuration management view (according to the proxy technique discussed above) can issue modification commands with respect to the resources managed by a remote server. In such a case, when a user initiates an active command (e.g., forwards an active command to the management control system) to modify configuration information associated with one or more resources managed by the remote server, the management control system acts as a proxy for passing the active commands to the respective remote server. Upon receipt of an active command, the respective remote server executes appropriate business logic to carry a command (e.g., a change to configuration information). If execution of the active command at the remote server results in a corresponding change to a configuration view, the remote server forwards the new configuration view to the management control system. The management control system then acts as a proxy to forward the new configuration view to a respective display screen viewed by the user issuing the active command.

Figure 1:
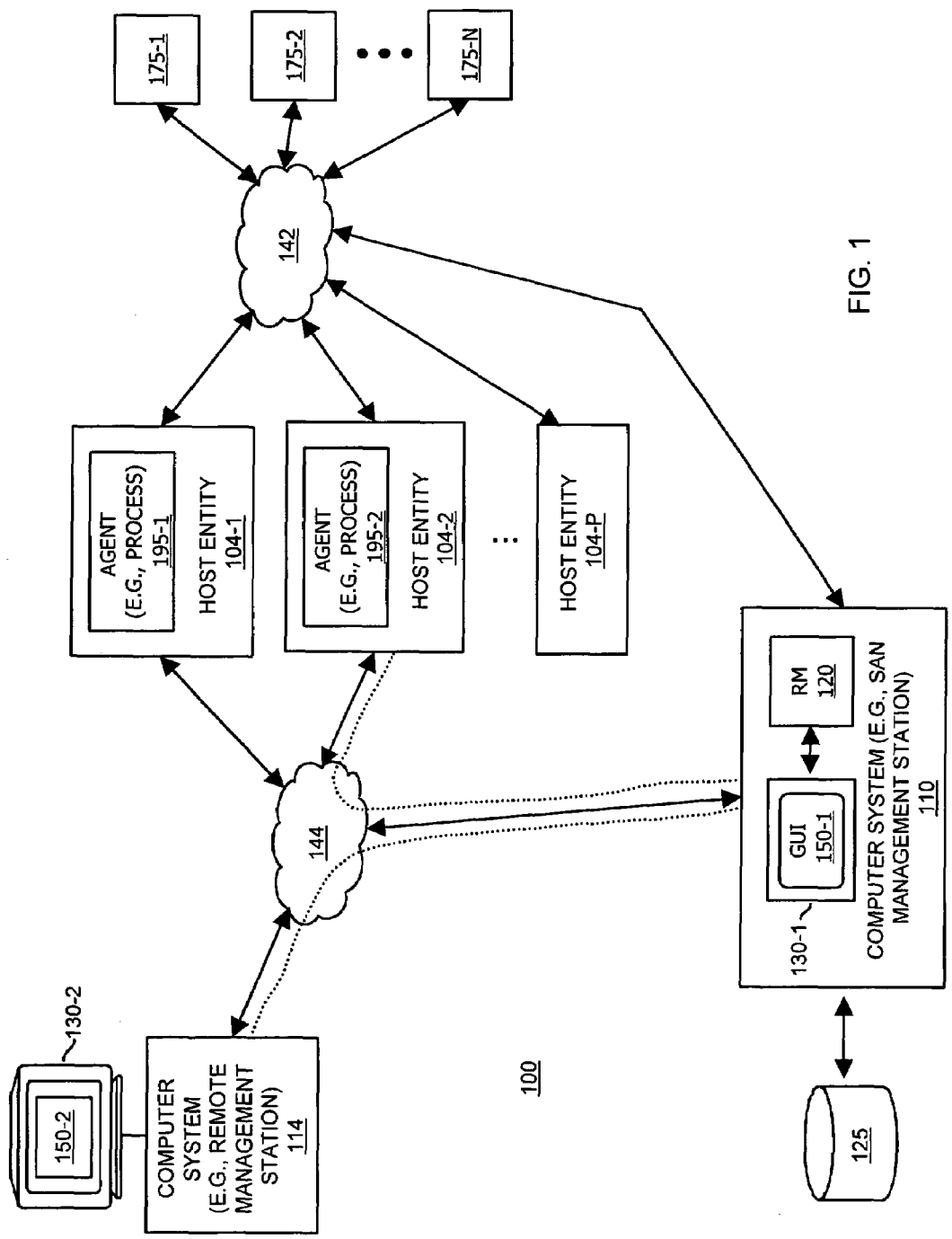
FIG. 1 is a block diagram of a storage area network environment configured to operate according to an embodiment herein.

FIG. 1 illustrates a storage area network environment 100 suitable for explaining an operation of example embodiments herein. As shown, storage area network environment 100 (e.g., potentially including multiple types of networks) includes a network medium 142 such as a high-speed data communications medium (e.g., Ethernet, optical network, or other type of network) that interconnects a plurality of components such as storage resources 175-1, 175-2, . . . , 175-N (collectively, storage resources 175), and host entities 104-1 (e.g., servers), 104-2, . . . , 104-P (collectively, host devices 104). During operation, clients communicate with host entities 104 to access data from storage systems 175.

Each respective host entity 104 can have none, one, or more corresponding agents 195 (e.g., software agents) that support a respective management task such as manage a portion of configuration information associated with storage area network environment 100. According to one embodiment, duties of managing configuration information are distributed amongst multiple remote processes (as well as at computer system 110) rather than being performed only by a central server such as computer system 110. Note that agents 195 are not restricted to running on host entities 104. They can reside elsewhere in storage area network environment 100 such as at storage systems 175 or any other site.

In addition to managing at least a portion of resources associated with storage area network environment 100, computer system 110 includes resource manager 120 such as a software application that supports local generation of graphical user interface 150-1 on display 130-1 for managing resources and corresponding configuration information associated with storage area network environment 100. Note that computer system 110 also acts as a server to the extent that a user can utilize computer system 114 (e.g., a remotely located computer system having a browser) to manage resources and corresponding configuration information associated with storage area network environment 100 via graphical user interface 150-2 on display screen 130-2 from a remote location with respect to the computer system 110. Thus, a network administrator need not be restricted to managing storage area network environment 100 via graphical user interface 150-1 on respective display screen 130-1.

In general, computer system 110 receives input from a respective user (e.g., network administrator) or other source regarding what and/or how to display information on a respective display screen 130. In this example, assume that the user resides at computer system 114 and views graphical user interface 150-2 on display screen 130-2. Computer system 114 forwards the commands received from the respective user over network 144 to computer system 110. Network 144 can be any type of communications medium that supports transmission of data from one node to another based on a well-known client-server architecture.

According to one embodiment, a user typically makes a selection of one of multiple view mode options for viewing resources and corresponding configuration information associated with storage area network environment 100. In response to a selection and request for a configuration view for display on display screen 130-2, computer system 110 either generates a configuration view for displaying and forwarding to respective display screen 130-2 or, if the computer system 110 does not manage such resources, the resource manager 120 forwards the request to an appropriate agent in storage area network environment 100 that manages such resources.

In the present example, assume that computer system 110 cannot handle the request for a configuration view received from computer system 114. In this case, resource manager 120 identifies which agent in storage area network environment 100 manages the selected resources and forwards the request to agent 195-1 in host entity 104-2. According to one embodiment, the computer system 110 utilizes RMI (Remote Method Invocation) techniques to retrieve a requested configuration view 550-2 from host entity 104-2.

In response to receiving the request for the configuration view, agent 195-1 generates a corresponding configuration view and forwards it to computer system 110. In turn, computer system 110 forwards the configuration view generated by agent 195-2 over network 144 to computer system 114 for display on graphical user interface 150-2 on display screen 130-2. Thus, according to this embodiment, the computer system 110 acts as a proxy for serving configuration views (e.g., views of configuration information) from host entity 104-2 to computer system 114.

In one embodiment, computer system 110 serves a respective configuration view to computer system 114 as an XML (Extensible Markup Language) data stream although any suitable format of transmitting data can be used. Computer system 114 displays configuration views in graphical user interface 150-2. Examples of configuration views will be more particularly discussed with respect to FIGS. 4 and 5.

Figure 2:
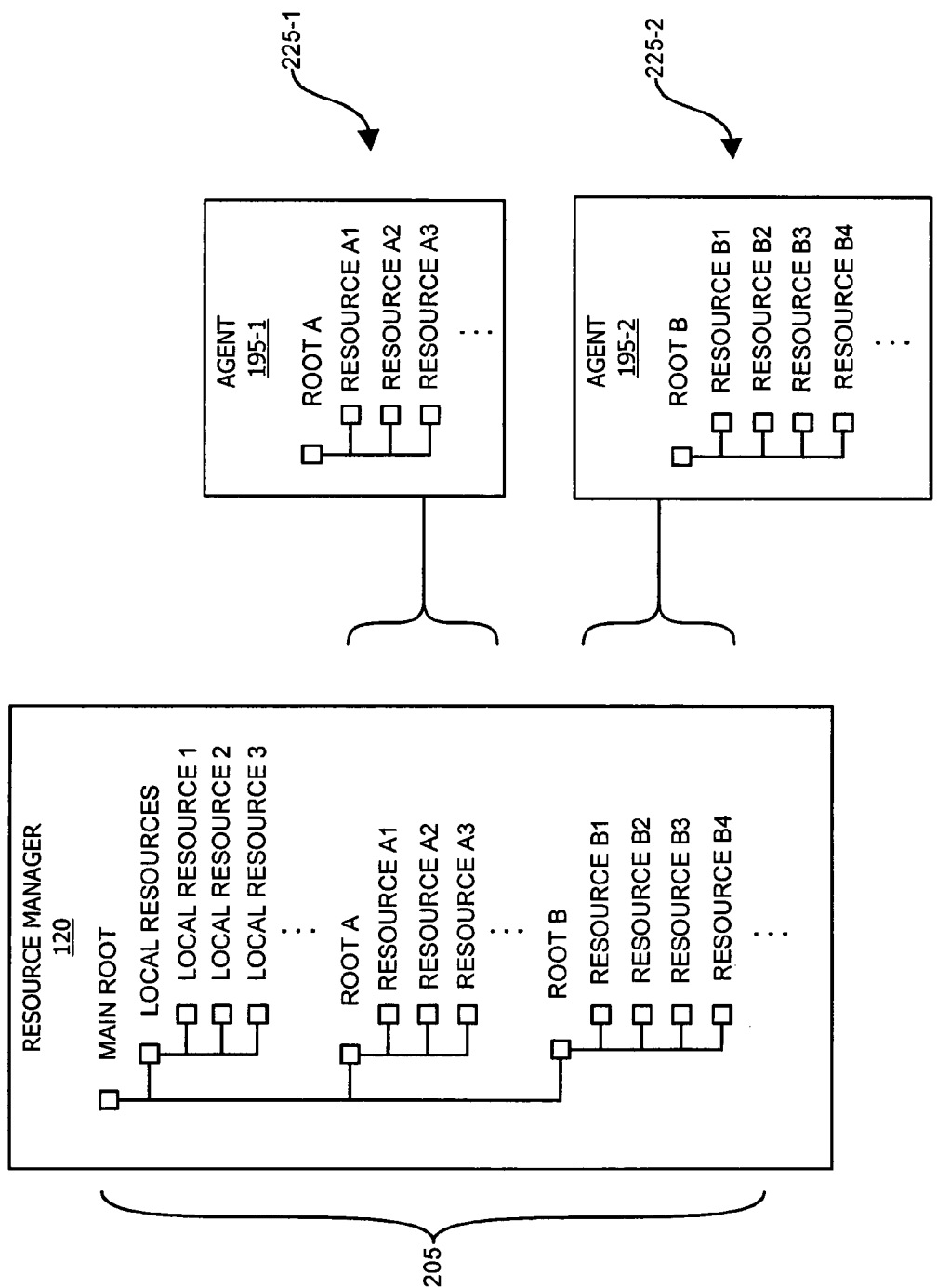
FIG. 2 is a diagram of a global hierarchical tree including plug-in hierarchical trees associated with respective remote servers according to an embodiment herein.

FIG. 2 is a diagram of a resource manager 120 maintaining a hierarchical tree 205 according to an embodiment herein. As shown, resource manager 120 generates hierarchical tree 205 (e.g., a "global" hierarchical tree or "system level" hierarchical tree) to keep track of storage area network resources managed by the resource manager 120 as well as storage area network resources managed by corresponding agents 195 at respective host entities 104. According to one embodiment, hierarchical tree 205 can be considered "global" in the sense that it accounts for all or nearly all of the storage area network environment 100 and not just storage area network resources managed by computer system 110.

For locally managed storage area network resources (e.g., listed as LOCAL RESOURCES under MAIN ROOT), resource manager 120 stores respective configuration information in repository 125 as shown in FIG. 1. Resource manager 120 does not maintain configuration information associated with other portions of hierarchical tree 205 such as ROOT A and ROOT B because respective agents 195-1 and 195-2 maintain configuration information associated with the resources listed under ROOT A and ROOT B. In one embodiment, host entities 104 store configuration information and related information such as business logic, access information, etc. associated with respective storage area network resources in repositories such as in one or more storage systems 175 of storage area network environment 100.

In one embodiment, corresponding business logic resides at computer system 110 as well as each remote server such as respective host entity 104-1 and host entity 104-2. The business logic residing at each respective server manages a corresponding set of resources managed by the respective server. In other words, each of the host entities 104 executes business logic to locally manage the information in the respective repositories. This one reason why computer system 110 acts a proxy for serving configuration views to remote users. The computer system 110 does not locally manage all of the resources with the storage area network environment. Instead, corresponding business logic residing at different remote sites in the storage area network each carry out different respective management duties. For example, computer system 110 manages its own repository of configuration information, while each of the host entities 104 manage their own respective repository of managed configuration information.

As will be further discussed later in this specification, computer system 110 is able to locally generate configuration views associated with locally managed resources in the hierarchical tree 205 under the branch labeled LOCAL RESOURCES via respective local business logic running on computer system 110. As discussed above, configuration views can include icons, text, and/or other images or pictures of information enabling a respective network administrator to identify a configuration of storage area network environment 100. Note that computer system 110 acts a proxy for serving configuration views associated with remotely managed resources such as those under ROOT A and ROOT B of hierarchical tree 205. Computer system also acts as a proxy when a respective user issues an active command to modify configuration information at host entity 104-2 as will be further discussed later in this specification.

Each software agent 195 (e.g., process) maintains a respective hierarchical tree 225 for keeping track of storage area network resources managed by a respective agent 195 (e.g., business logic residing at the remote server). According to one embodiment, resource manager 120 at computer system 110 communicates with and collects information from each of multiple agents 195 to learn of their respective hierarchical trees 225.

Based on collected information (e.g., contents of the hierarchical trees 225) from the agents 195, the resource manager 120 creates hierarchical tree 225. For example, resource manager 120 combines the retrieved hierarchical trees 225 with a portion of hierarchical tree (e.g., branch entitled LOCAL RESOURCES) of locally managed resources to produce "global" hierarchical tree 205 which accounts for all or potentially a sub-portion of storage area network resources in storage area network environment 100. Thus, in one sense as shown, both hierarchical tree 225-1 and hierarchical tree 225-2 are "plugged" into hierarchical tree 205 maintained by resource manager 120. When a change occurs to a remotely located hierarchical tree 225 at a respective host entity 104, the resource manager 120 communicates with the respective host entity 104 so that hierarchical tree 205 is synchronized to include the most recent information associated with respective hierarchical trees 225.

Figure 3:
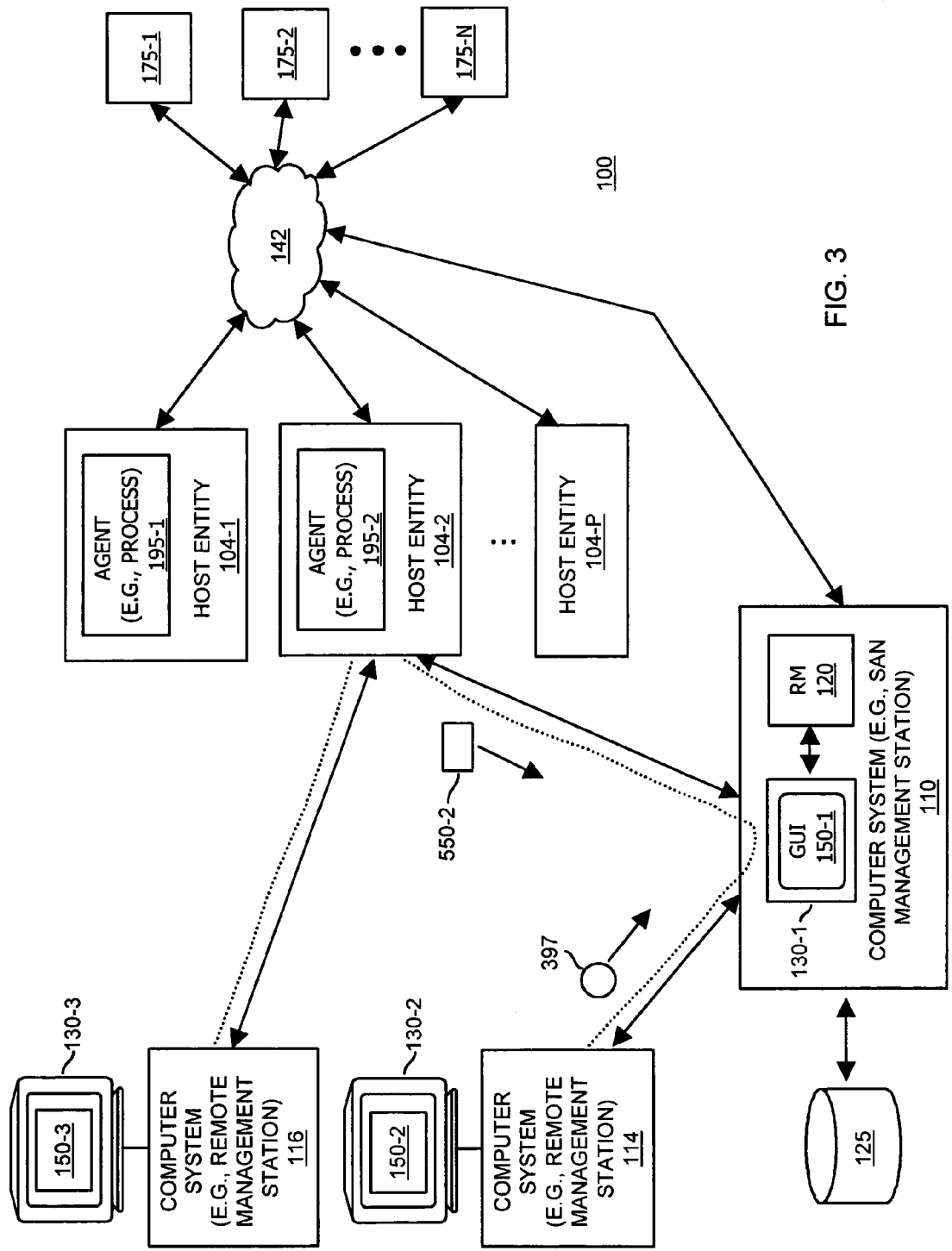
FIG. 3 is a block diagram of a storage area network environment including multiple remotely located browsers for viewing storage area network configuration information according to an embodiment herein.

FIG. 3 is a diagram of storage area network environment 100 further illustrating use of hierarchical tree 205 according to an embodiment herein. As discussed, computer system 110 (e.g., an integrated server) maintains hierarchical tree 205 (in FIG. 2) but does not actually manage and locally store the respective configuration information associated with storage area network resources listed under a respective ROOT of each remotely retrieved hierarchical tree 225. A user can select an item in the hierarchical tree 205. In such a case, when a user at computer system 114 communicates with computer system 110 and selects to view a configuration view associated with a resource that is managed by a remote agent 195, the computer system 110 acts as a proxy to serve a respective configuration view to computer system 114. The computer system 110 also acts as a proxy for passing active commands received from a user to the remote agent 195 for execution. The following example more particularly illustrates this technique.

Figure 4:
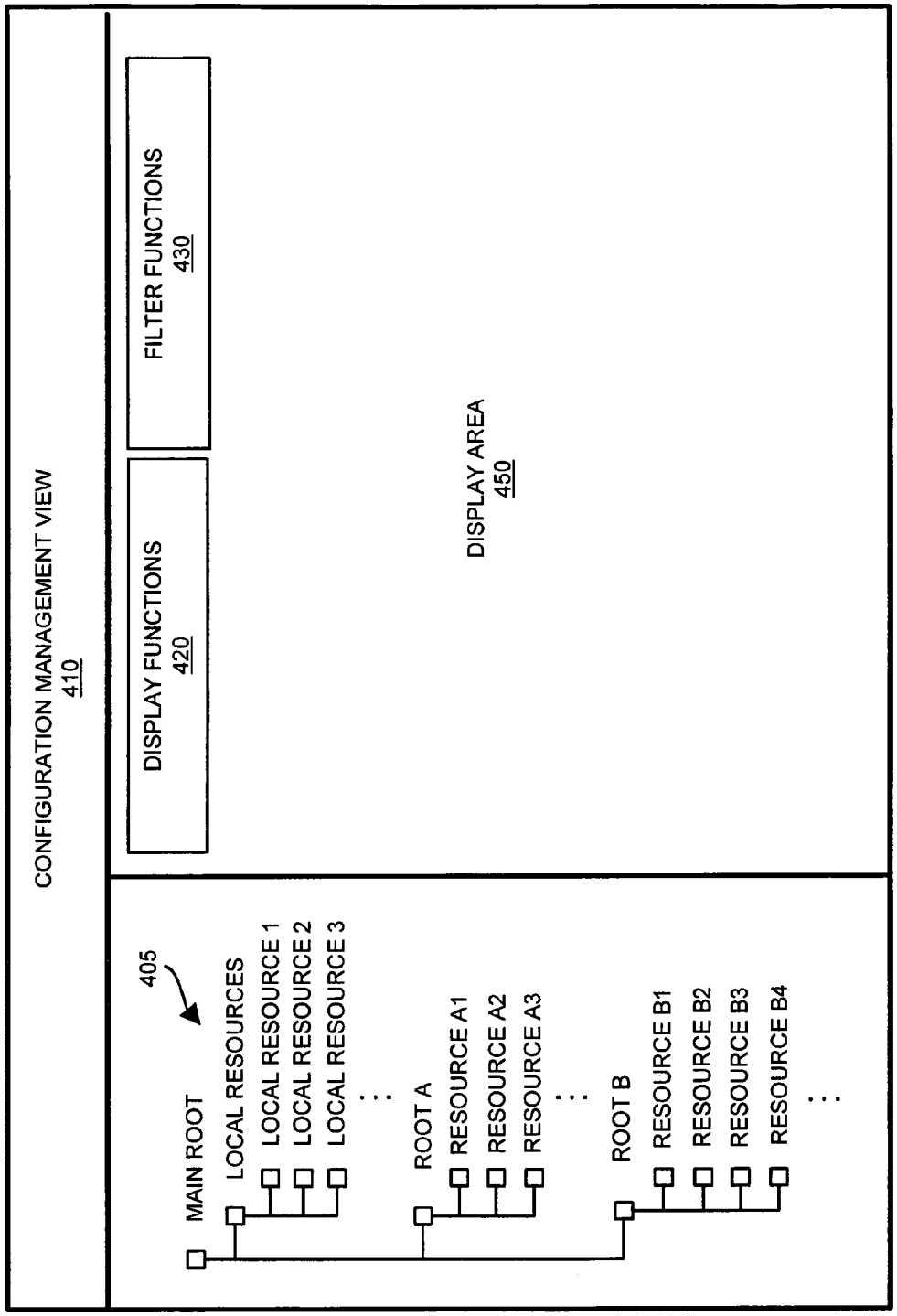
FIG. 4 is a diagram of a graphical user interface for display on a browser according to an embodiment herein.

In this example, assume that a user at computer system 114 logs onto computer system 114 for purposes of viewing configuration information associated with storage area network environment 100. Initially, computer system 110 initiates a display of configuration management view 410 (as shown in FIG. 4) on display screen 130-2 for the user. Via configuration management view 410, the user can select resources from hierarchical tree 405 and view respective configuration information in display region 450 of configuration management view 410. Filter functions 430 in configuration management view 410 enable the user to filter a selection of resources. Display functions 420 in configuration management view 410 enable the user to select what and how configuration information will be displayed for the user to view in display region 450.

Since configuration management view 410 includes a rendition of the "global" hierarchical tree 205 associated with storage area network environment 100, the user at computer system 114 can access respective business logic and view configuration information associated with storage area network resources managed by computer system 110 as well as host entities 104. As discussed, business logic for managing different portions of the hierarchical tree resides at different respective servers depending on which of the remote servers manages a corresponding group of resources in the hierarchical tree.

In one embodiment, a corresponding user at computer system 116 that communicates directly with host entity 104-2 can only view configuration information under ROOT B managed by host entity 104-2. Thus, a user at respective computer system 114 that communicates with an integrated server (such as computer system 110) has a greater selection of storage area network resources for viewing respective configuration information because the computer system 110 acts as a proxy to retrieve configuration views from the standalone servers in storage area network environment 100.

Note that a user at display screen 130-3 of computer system 116 can initiate a direct connection between computer system 116 and host entity 104-2. This direct connection affords the user at computer system 116 an ability to execute the same functionality that computer system 114 provides a respective user via use of computer system 110 acting a proxy. For example, a user can send a request for a respective configuration view over the direct connection between computer system 116 and host entity 104-2. Upon receipt of the request, host entity 104-2 (via respective business logic) serves the configuration view to computer system 116. In addition to requesting configuration views, the user can then issue active commands over the direct link to execute business logic residing on host entity 104-2. One purpose of issuing active commands (e.g., delete, add, modify, etc.) and initiating execution of business logic over the direct link is to modify a configuration of resources locally managed by host entity 104-2.

Upon receipt of an active command from computer system 116 over the direct link, the business logic in host entity 104-2 makes a change to the locally managed configuration information. In the event that execution of the active command causes a change to a configuration view viewed by the user on respective display screen 130-3, business logic at host entity 104-2 initiates forwarding the update configuration view over the direct connection to display-screen 130-3. As an example, a user may be viewing a listing of resources in a respective configuration view and issue a command to delete one of the resources. In this case, the business logic would receive the command, initiate deletion of a managed object from the listing according to the received command, and serve an updated configuration view to the user of a new listing not including the deleted resource.

Continuing now with the present example and the discussion with respect to the indirect link from computer system 114 through computer system 110 to host entity 104-2, assume that the user at computer system 114 initiates a request 397 for a configuration view associated with storage area network resources managed by host entity 104-2. Because computer system 114 is connected via a respective link to computer system 110, computer system 110 receives the request 397 and references a display list (e.g., a Document Object Model) to determine whether the requested configuration view corresponds to a configuration view that can be generated locally by computer system 110 or remotely by a respective host entity 104. The display list maintained by computer system 110 indicates configuration views that can be generated locally and also includes identifiers of remote servers for respective configuration views that must be generated remotely by respective host entities 104.

In this example, assume that request 397 corresponds to a requested view of configuration information managed by host entity 104-2. Based on use of the display list in computer system 110, the computer system 110 identifies that the request 397 corresponds to a configuration view of configuration information that must be generated by agent 195-2. In other words, computer system 110 identifies that the request 397 corresponds to resources in a portion of the hierarchical tree 205 managed by computer system 110 or a remote server (e.g., host entity 104-2).

Thus, according to one embodiment, a user at computer system 114 can view one of two configuration views for a given element such as a managed resource. For example, if a respective configuration view requested by 114 is defined and managed by the computer system 110 (e.g., an integration server), the respective configuration view is generated and served locally from computer system 110 to computer system 114. If a respective configuration view requested by computer system 114 is handled by a remote process such as by agent 195-2 rather than handled by computer system 110, the respective configuration view is generated at host entity 104-2 and passed through computer system 110 to computer system 114. Accordingly, computer system 110 acts as a proxy for serving configuration views as well as actively originates certain configuration views that are served to computer system 114.

Note that, according to one embodiment, it is a respective view itself that determines whether the view should be rendered locally or by a remote process in storage area network environment 100. In other words, if a user requests a configuration view of resources managed locally by the computer system 110, corresponding business logic at the computer system 110 serves the configuration view. Alternatively, in the present example, if a user requests a configuration view of resources remotely managed by a server other than computer system 110, computer system 110 acts as a proxy for serving the configuration view from the appropriate server that manages the configuration view and corresponding resources.

Based on receipt of the request 397 in this example, computer system 110 forwards an element identifier (corresponding to the request 397) from the display list to agent 195-2. In response, the agent 195-2 generates a configuration view 550-2 associated with the request 397. Computer system 110 receives the remotely generated configuration view 550-2 and forwards it to computer system 114 for display on graphical user interface 150-2 of display screen 130-2 (as in FIG. 3).

Figure 5:
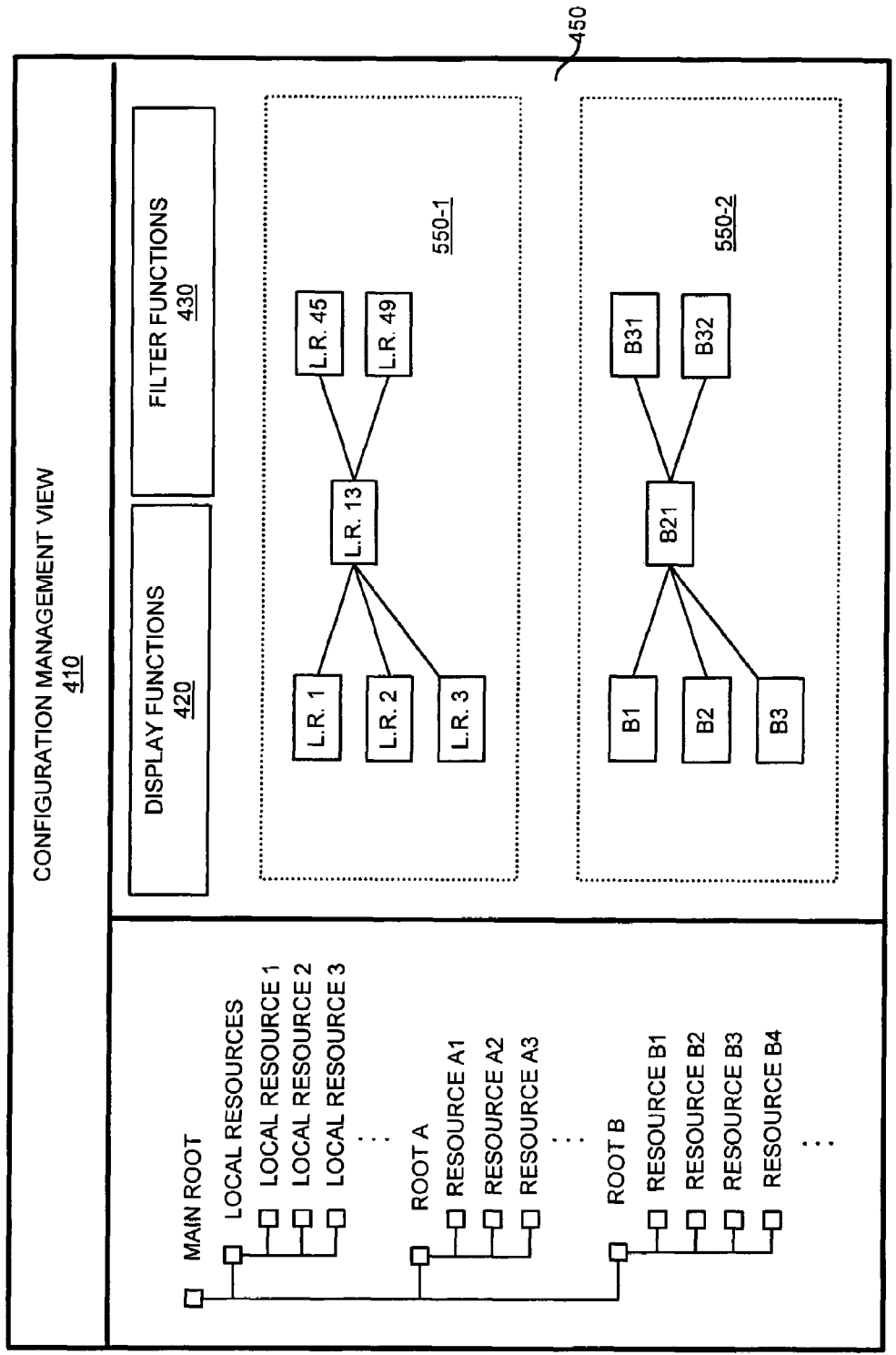
FIG. 5 is a diagram of a graphical user interface for display on a browser according to an embodiment herein.

As mentioned, note that a user at display screen 130-2 viewing a respective configuration management view can issue modification commands with respect to the resources managed by host entity 104-2 (e.g., a remote server). When a user initiates an active command (e.g., forwards an active command to computer system 110) to modify configuration information associated with one or more resources managed by the host entity 104-2, computer system 110 acts as a proxy for passing the active command to the host entity 104-2. In turn, host entity 104-2 executes appropriate business logic to carry out the command (e.g., a change to configuration information) received from the computer system 110 which was issued by the computer system 114. In other words, business logic in host entity 104-2 executes the command and makes corresponding changes to corresponding locally managed configuration information affected by the active command. If execution of the active command by the business logic at the host entity 104-2 results in a corresponding change to a configuration view, the host entity 104-2 forwards the new configuration view to computer system 110. As discussed, computer system 110 then acts as a proxy to forward the updated configuration view to the user at display screen 130-2. FIG. 5 is a diagram of a configuration management view 410 including a remotely generated configuration view 550-2 on display screen 130-2 according to an embodiment herein. As shown, computer system 114 receives the configuration view 550-2 from computer system 110 and displays it in display region 450 for viewing by the respective user. Note that configuration view 550-2 includes resources (e.g., resource B1, resource B2, etc.) under ROOT B of hierarchical tree 225-2. Thus, this example illustrates how computer system 110 acts as a proxy for serving a remotely generated configuration view 550-2 to computer system 114.

As discussed with respect to FIG. 3, the respective user at computer system 114 can request a configuration view associated with resources managed by computer system 110. In such a case, computer system 110 does not act as a proxy. Instead, computer system 110 generates a respective configuration view and forwards it computer system 114 for viewing by the respective user on display screen 130-2. Note that FIG. 5 also includes an example of configuration view 550-1 generated by computer system 110. As shown, configuration view 550-1 includes configuration information associated with resources under the branch labeled LOCAL RESOURCES in hierarchical tree 405.

Note that both host entity 104-1 and host entity 104-2 (e.g., stand alone servers) can generate configuration views for a respective user at computer system 116 based on storage area network resources in hierarchical tree 225-2. For example, as shown in FIG. 3, computer system 116 can communicate directly with host entity 104-2 to retrieve configuration views according to an embodiment herein. In this instance, host entity 104-2 initiates a display of a configuration management view (similar to as configuration management view 410 as shown in FIG. 4) on display screen 130-3. However, a region occupied by hierarchical tree 405 in configuration management view 410 is replaced with ROOT B so that a respective user can only select resources from ROOT B rather than any of all resources shown in hierarchical tree 205.

As discussed, one purpose of this system topology is to distribute management duties amongst different servers of the storage area network environment 100. For example, each of the agents 195 in host entities 104 (i.e., standalone servers) can be assigned a task of managing resources associated with a respective type of storage system (e.g., Symmetrix™, Clariion™, etc.) while computer system 110 (i.e., an integrated server) can be assigned a task of managing storage area network management functions such as management of zones, LUN masking, etc.

Figure 6:
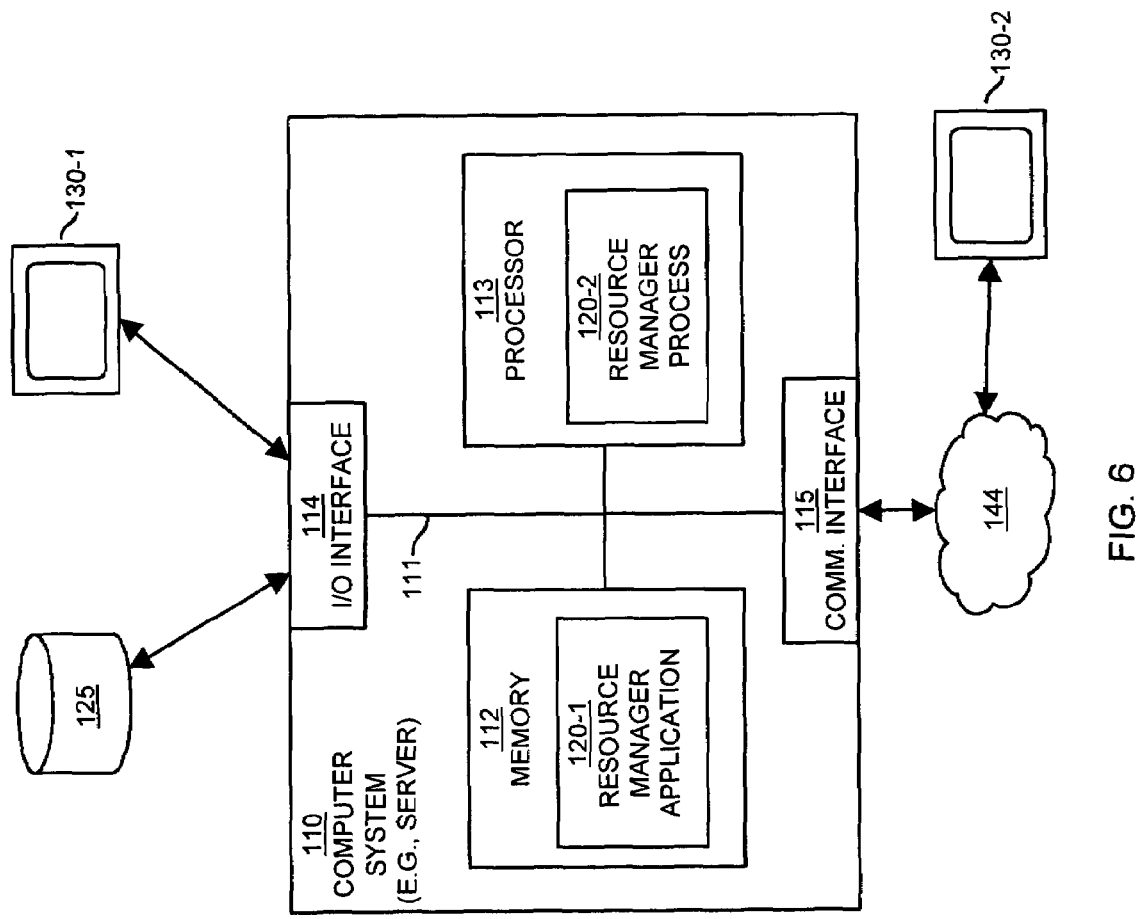
FIG. 6 is a diagram of an example computer system for executing techniques according to an embodiment herein.

FIG. 6 is a block diagram illustrating an example architecture of computer system 110 (e.g., a storage area network management station). Computer system 110 may be a digital processing device such as a personal computer, workstation, portable computing device, console, laptop, network terminal, etc.

As shown, computer system 110 of the present example includes an interconnect 111 that couples a memory system 112, a processor 113, an input/output interface 114, and a communications interface 115. Peripheral device 116 (e.g., one or more viewer controlled devices such as a keyboard, mouse, etc.) couples to processor 113 through I/O interface 114 and enables user 108 to provide input commands and thus generally control display management functions associated with graphical user interface 150-1. Repository 125 stores managed objects associated with locally managed hardware and software resources in the storage area network environment 100. Communications interface 115 enables computer system 110 (and corresponding user 108) to communicate with other devices such as computer system 114 so that a respective user can remotely retrieve and view configuration information associated with storage area network environment 100.

As shown, memory system 112 is encoded with resource manager application 120-1 supporting generation, display, and implementation of graphical user interface 150 for retrieving, viewing, and managing configuration information associated with respective storage area network resources. Resource manager application 120-1 may be embodied as software code such as data and/or logic instructions (e.g., code stored in the memory or on another computer readable medium such as a disk) that support processing functionality according to different embodiments described herein.

During operation, processor 113 accesses memory system 112 via the interconnect 111 in order to launch, run, execute, interpret or otherwise perform the logic instructions of the resource manager application 120-1. Execution of resource manager application 120-1 produces processing functionality in resource manager process 120-2. In other words, the resource manager process 120-2 represents one or more portions of the resource manager application 120-1 (or the entire application 120-1) performing within or upon the processor 113 in the computerized device 110. As discussed, one purpose of the resource manager 120 is to facilitate a display of a respective configuration view associated with a selected set of managed objects (e.g., resources) in the storage area network environment 100.

It should be noted that the resource manager 120 executed in computer system 110 is represented in FIG. 6 by either one or both of the resource manager application 120-1 and/or the resource manager process 120-2. For purposes of this discussion, general reference will be made to the resource manager 120 as performing or supporting the various steps and functional operations to carry out techniques discussed herein.

It should also be noted that example configurations herein include the resource manager application 120-1 itself (i.e., the un-executed or non-performing logic instructions and/or data). The resource manager application 120-1 may be stored on a computer readable medium (such as a floppy disk), hard disk, or optical medium. The resource manager application 120-1 may also be stored in a memory system 112 such as in firmware, read only memory (ROM), or, as in this example, as executable code in, for example, Random Access Memory (RAM). In addition to these embodiments, it should also be noted that other embodiments herein include the execution of resource manager application 120-1 in processor 113 as the resource manager process 120-2. Thus, those skilled in the art will understand that the computer system 110 may include other processes and/or software and hardware components, such as an operating system that facilitates carrying out management functions associated with the storage area network.

Figure 7:
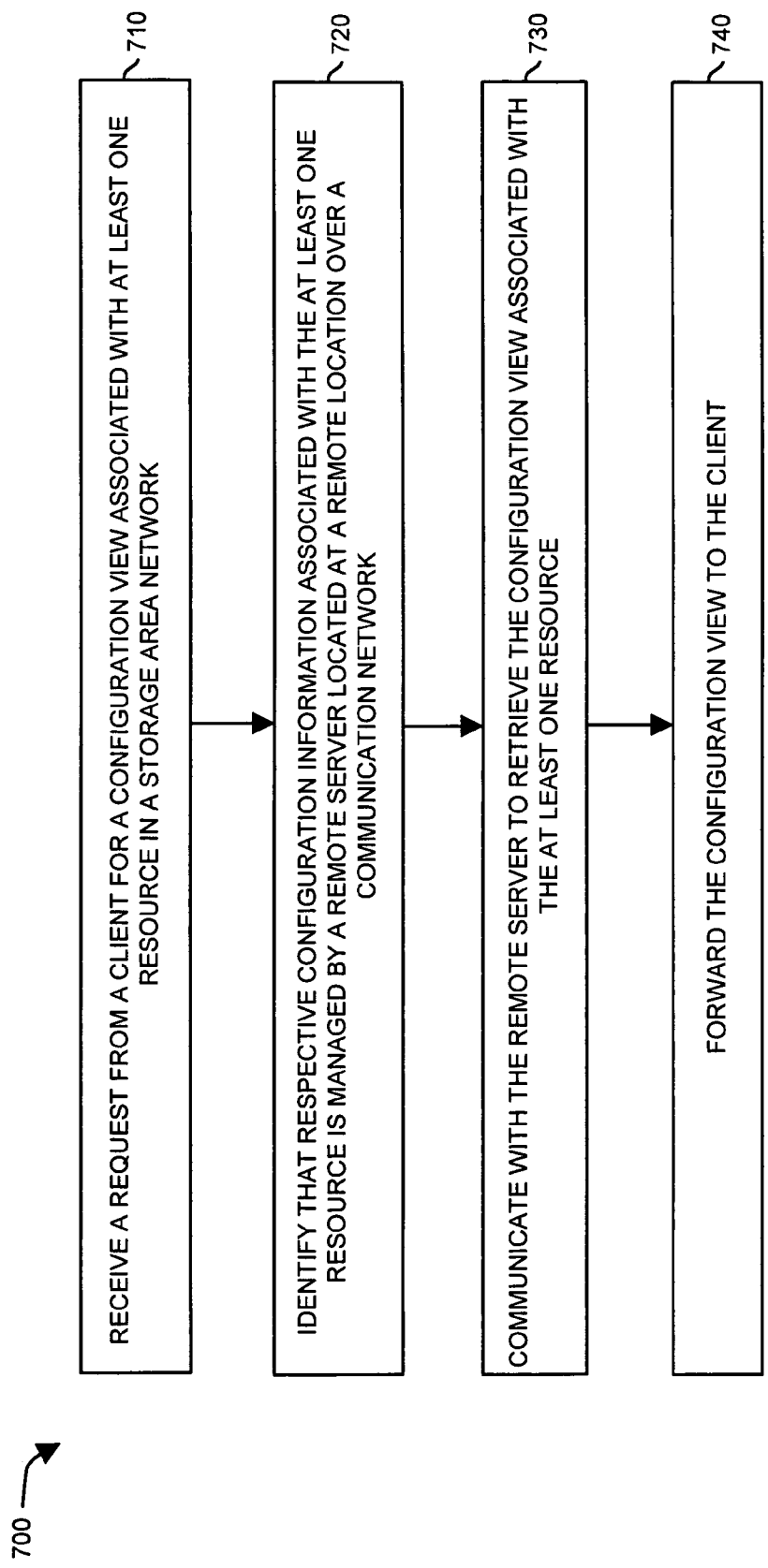
FIG. 7 is a flowchart illustrating a technique of providing a configuration view according to an embodiment herein.

FIG. 7 is a flowchart 700 illustrating a technique of displaying configuration views according to an embodiment herein. Note that the following discussion of flowchart 700 overlaps with the concepts and techniques discussed above.

In step 710, resource manager 120 of computer system 110 receives a request 397 from computer system 114 (e.g., a client) for a configuration view 550-2 associated with a selected one or more resources in the storage area network environment 100.

In step 720, upon receipt, resource manager 120 identifies that respective configuration information associated with the request 397 is managed by a host entity 104-2 (e.g., a remote server) located over a communication network 144.

In step 730, resource manager 120 communicates with the host entity 104-2 to retrieve the requested configuration view 550-2 associated with the selected one or more resources.

In step 740, resource manager 120 forwards the requested configuration view 550-2 to computer system 114 for viewing in graphical user interface 150-2 of display screen 130-2.

Figure 8:
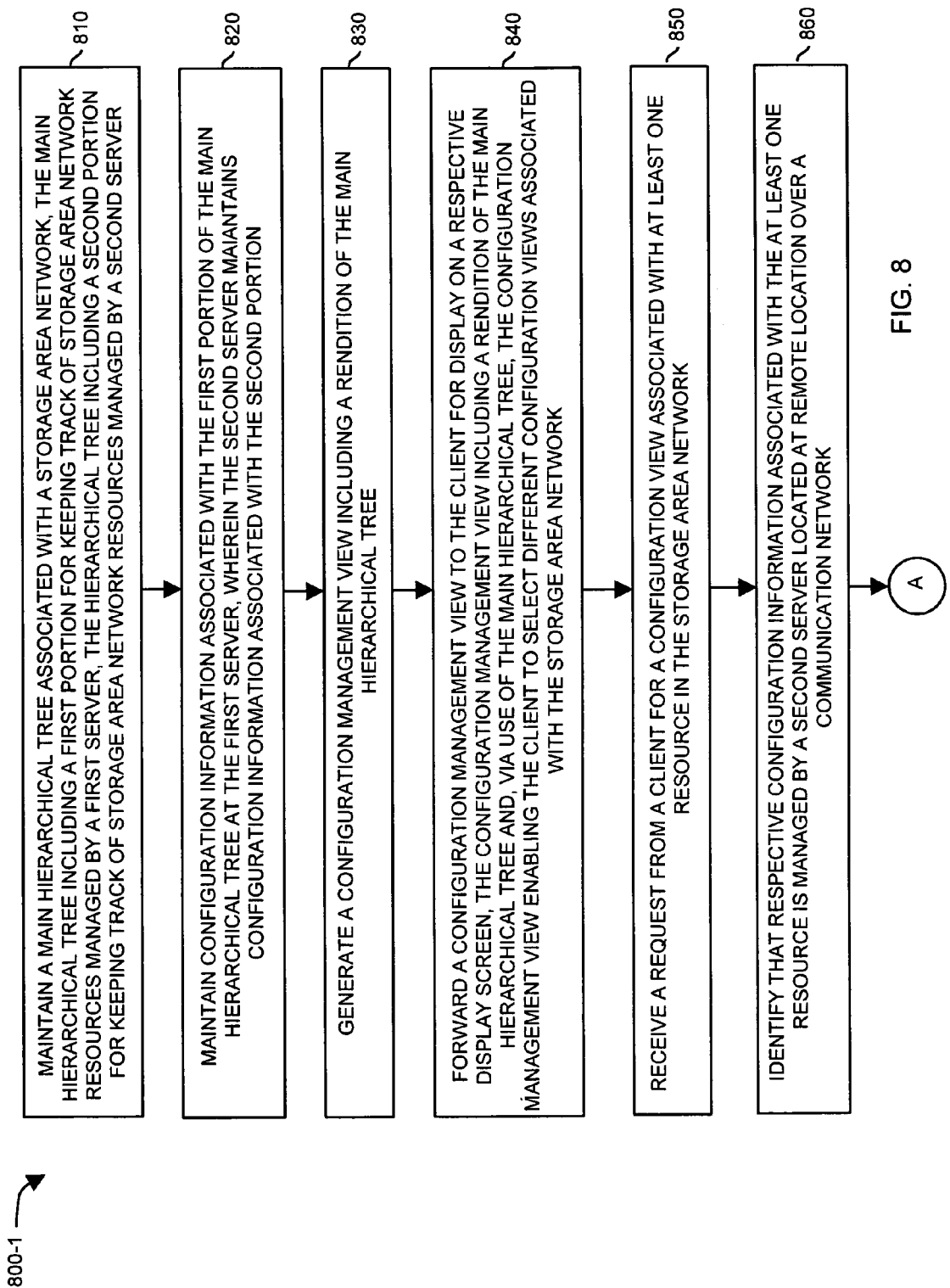
FIGS. 8 and 9 combine to form a flowchart illustrating a technique of disseminating configuration information associated with storage area network resources according to an embodiment herein.
Figure 9:
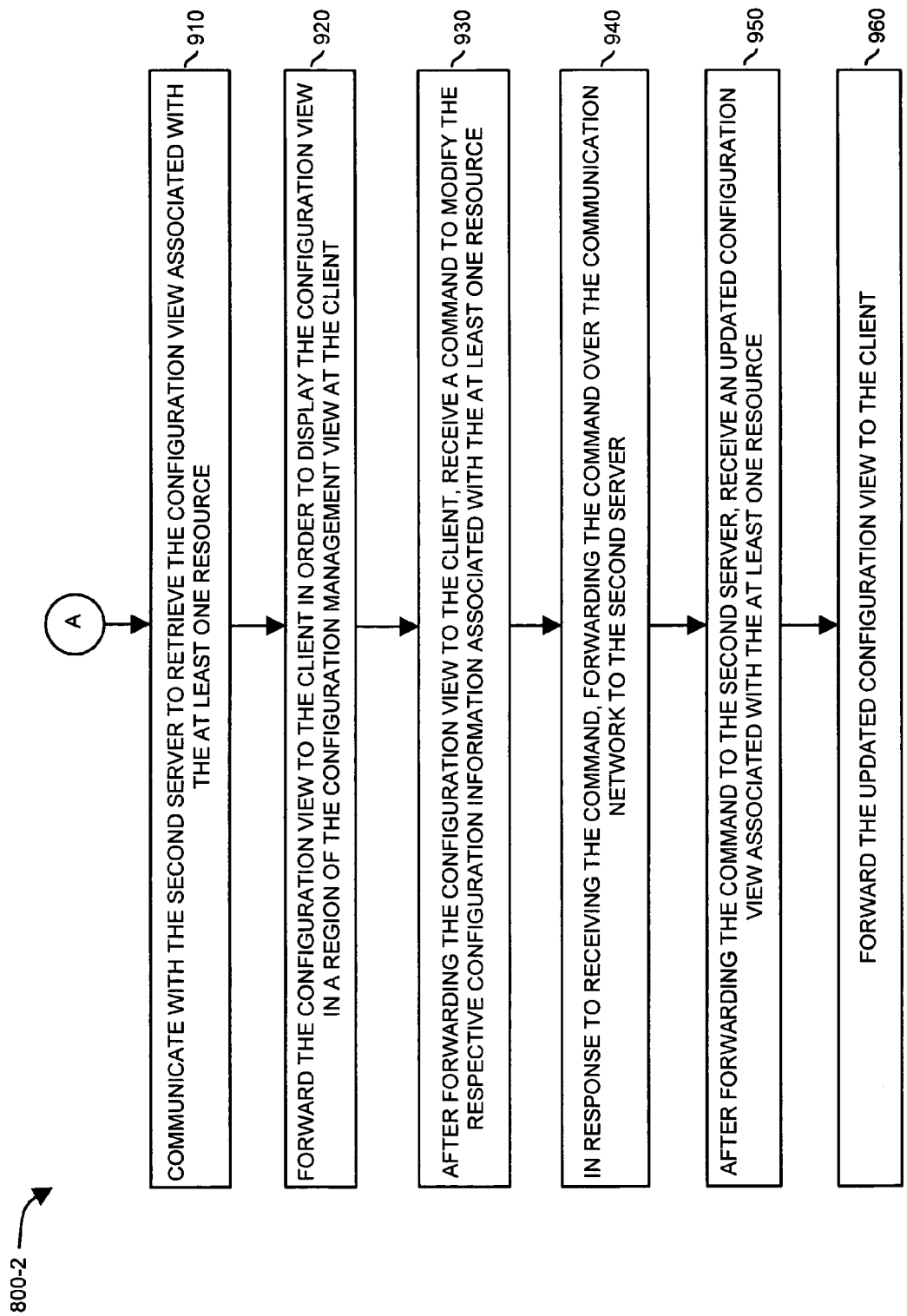

FIGS. 8 and 9 combine to form a more detailed flowchart 800 (e.g., flowchart 800-1 and flowchart 800-2) illustrating processing steps associated with computer system 110 and, more particularly, resource manager 120.

In step 810 of FIG. 8, resource manager 120 maintains hierarchical tree 205 (e.g., a main or global hierarchical tree) associated with the storage area network environment 100. The hierarchical tree 205 includes a first portion for keeping track of storage area network resources locally managed by computer system 110. The hierarchical tree 205 includes a second portion for keeping track of storage area network resources managed by host entity 104-2.

In step 820, resource manager 120 maintains configuration information associated with the first portion of the hierarchical tree 205. Host entity 104-2 maintains configuration information associated with the second portion of hierarchical tree 205.

In step 830, resource manager 120 generates a configuration management view 410 including a rendition of the main hierarchical tree 205.

In step 840, resource manager 120 forwards the configuration management view 410 to computer system 114 (e.g., a client) for display on respective display screen 130-2. The configuration management view 410 includes a rendition of the main hierarchical tree 205 associated with storage area network environment 100. Via the display of hierarchical tree 205 on display screen 130-2, the client can select different configuration views associated with the storage area network environment 100.

In step 850, resource manager 120 receives a request 397 from computer system 114 for a configuration view associated with one or more resource selected from the hierarchical tree 205.

In step 860, resource manager 120 identifies that respective configuration information associated with the selected one or more resource is managed by host entity 104-2.

In step 910 of FIG. 9, resource manager 120 communicates with the host entity 104-2 to retrieve the configuration view 550-2 associated with the one or more resource selected from the hierarchical tree 205.

In step 920, resource manager 120 forwards the configuration view 550-2 to computer system 114 in order to display the configuration view 550-2 in display region 450 of the configuration management view 410 on display screen 130-2.

In step 930, after forwarding the configuration view 550-2 to the computer system 114, the resource manager 120 receives a command to modify respective configuration information associated with the selected one or more resource.

In step 940, in response to receiving the modification command, resource manager 120 forwards the modification command over network 144 to the host entity 104-2. In response, host entity 104-2 initiates a respective modification to the configuration information it manages. Changing the configuration information in this way can result in a change to a respective configuration view. As an example, a user may add or delete a resource to ROOT B of the hierarchical tree 205. In such a case, host entity 104-2 generates an updated configuration view 550-2 including the newly added or deleted resource for viewing in configuration view 550-2 on display screen 130-2.

In step 950, after forwarding the command to the host entity 104-2, resource manager 120 receives an updated configuration view 550-2 associated with the one or more resource from host entity 104-2.

In step 960, resource manager 120 forwards the updated configuration view to computer system 114 for display on respective display screen 130-2. Accordingly, a user can initiate changes to configuration information and then view respective changes on his respective display screen 130-2.

Note that a respective user at computer system 116 may be simultaneously viewing the same configuration view 550-2 as a respective user at computer system 114. In such a case, host entity 104-2 can also send an updated configuration view to computer system 116 so that the respective user is informed of changes made by computer system 114.

Figure 10:
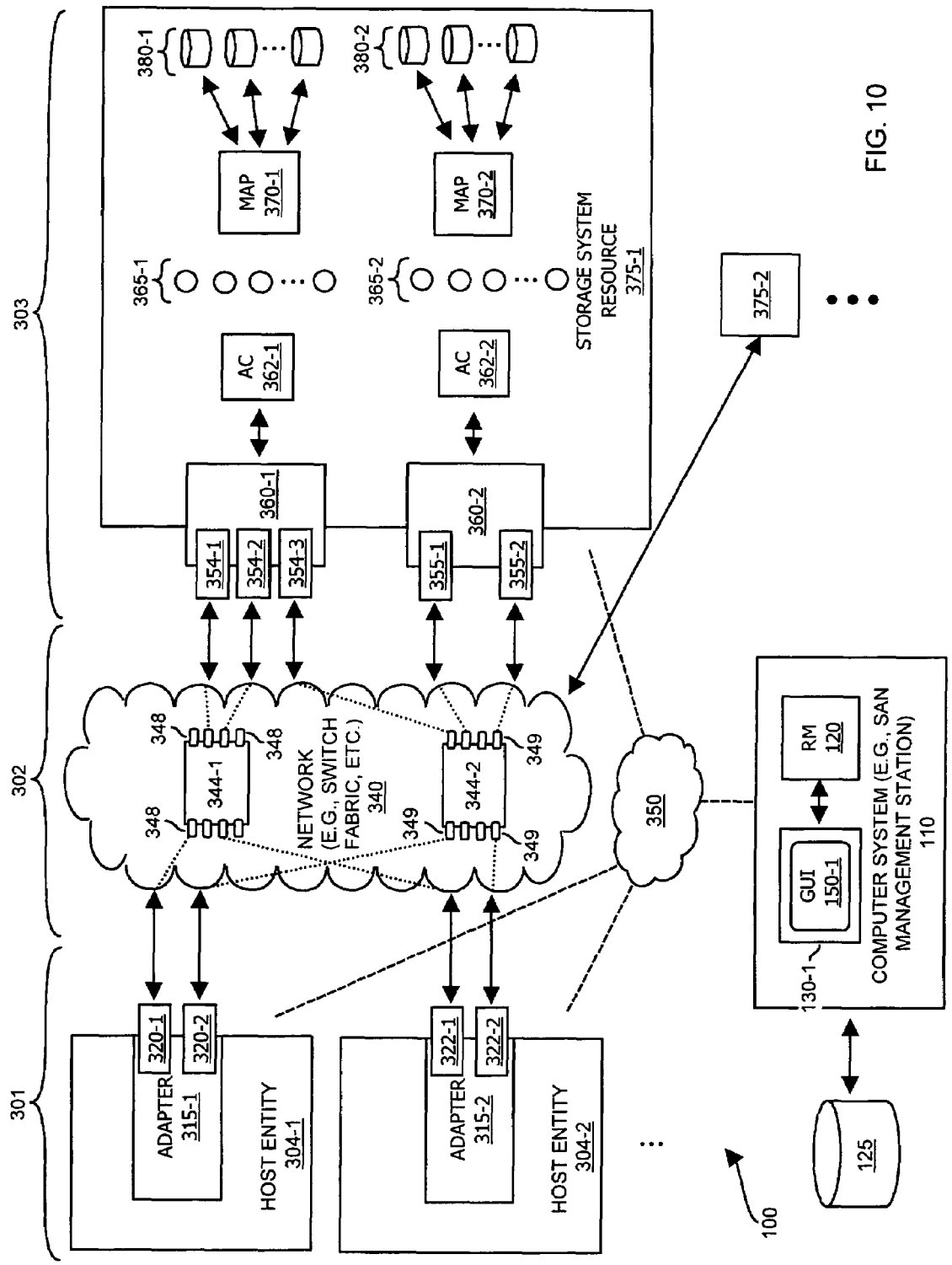
FIG. 10 is a diagram of a sample storage area network environment according to an embodiment herein.

FIG. 10 is a block diagram more particularly illustrating connectivity of example network resources (e.g., host resources 301, switch resources 302, and storage resources 303) in a storage area network environment 100. Thus, FIG. 2 includes examples of different types of hardware and software resources and corresponding configuration information that can be managed by respective servers in storage area network environment 100. As discussed, business logic for managing respective storage area network resources resides at computer system 110 as well as at selected one or more of host entities 304. Computer system 110 acts as a proxy when a respective network administrator requests to receive configuration views or modify configuration information associated with resources managed by remote resources such as host entities 304. For example, in this case, each of the remote servers runs corresponding business logic to carry out user commands and the computer system 110 merely acts a "pass-through" device. Alternatively, if computer system 110 manages resources associated with a configuration view requested by a respective network administrator, business logic at the computer system 110 carries out a respective request. In other words, in this latter case, the business associated with computer system 110 originates and serves a respective configuration view to the network administrator for viewing. The network administrator can initiate a modification to configuration information managed by either computer system 110 or a respective host entity 304. In a similar manner as discussed above, the respective business logic that manages the resources (to which an active command pertains) carries out the active command on behalf of the network administrator issuing the request. More specific details of such an embodiment were previously discussed with respect to FIGS. 1-5.

Referring again to FIG. 10, as shown, storage area network environment 100 includes host entity 304-1, host entity 304-2, . . . (collectively, host entities 304), network 340 (e.g., a high speed fiber-based switch fabric), network 350 (e.g., LAN, WAN, Internet, intranet, etc.), storage system resource 375-1, storage system resource 375-2, computer system 110, and repository 125. Network 340 includes switch device 344-1, switch device 344-2, and corresponding switch ports 348 and 349. Host entity 304-1 includes adapter 315-1. Adapter 315-1 has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

At a high level, FIG. 10 illustrates resources of a storage area network that potentially can be viewed and configured by a respective user via graphical user interface 150 supported by resource manager 120. As discussed, graphical user interface 150 (whether local or remote with respect to computer system 110) facilitates viewing of resources (e.g., an interrelationship of resources, connectivity of resources, topology of resources, details of resources, etc.) associated with storage area network environment 100 based on different viewing modes, which will be more particularly discussed in the following figures. An example of the different types of possible relationships associated with storage area network resources is also discussed in the co-pending U.S. Patent application entitled "METHODS AND APPARATUS FOR GUIDING A USER THROUGH A SAN MANAGEMENT PROCESS," by Hanna Yehuda and Morrie Gasser, Ser. No. 11/240,003, the entire teachings of which are incorporated herein by this reference. Note again that a remotely located user can view graphical user interface 150 on a remote browser (e.g., on display screen 130-2 as discussed) as well as on local display screen 130-1 at computer system 110.

In terms of the resources as shown in FIG. 10, network 340 and related resources enable host entities 304 (e.g., servers, host computers, etc.) to access data in storage system resources 375 on behalf of respective clients that communicate through host entities 304. As an example, host entity 304-1 (e.g., a server) couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375.

Based on paths through these resources, host entities 304 access data from physical storage devices 380. For example, host entity 304-1 accesses data from physical storage devices 380 based on a connection path through adapter 315-1, port 320-1, switch 344-1, port 354-1, adapter 360-1 to storage system resource 375-1. Thus, switch devices 344 and corresponding ports 348 and 349 form at least part of a connection path between host entities 304 and corresponding storage system resources 375.

Storage system resource 375-1 includes access controllers 362 to facilitate access to corresponding storage devices 365 (e.g., logical storage space). Storage devices 365 are configured as logical portions of one or more physical storage devices 380 (e.g., arrays of storage disks). Maps 370 provide a mapping of storage devices 365 (e.g., logical volumes) to corresponding physical storage devices 380 (e.g., storage disks).

Each host entity 304 may be limited to accessing certain storage devices 365 in storage system resource 375-1 based at least in part on configuration settings of switch devices 344 of network 340. For example, in one embodiment, switch ports 348 and 349 of switches 344 are assigned to create a particular zone in network 100. In general, a zone set defines a group of resources in the network providing a logical path between a host resource and a storage array resource. As will be discussed in more detail, the resource manager 120 enables selection of a management function associated with the storage area network environment 100 and guides the user 108 through corresponding process steps to execute the selected management function and configure resources in storage area network 100. This is discussed in more detail in the following text and related figures.

As discussed, techniques herein are well suited for use in applications such as management of storage area networks. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. In a first server, a computer-implemented method in which the first server executes instructions retrieved from computer storage for distributing configuration information associated with a storage area network, the computer-implemented method comprising:

maintaining a hierarchical tree associated with the storage area network, the hierarchical tree including a first portion for keeping track of references to storage area network resources managed by the first server, the hierarchical tree including a second portion for keeping track of references to storage area network resources managed by a second server;

wherein maintaining the hierarchical tree associated with the storage area network includes:
   communicating with the second server to learn of the second portion;
   receiving the second portion from the second server; and
   integrating the second portion with the first portion to produce the hierarchical tree, the method further comprising:

receiving a request from a client for a configuration view associated with at least one resource in the storage area network;

identifying that respective configuration information associated with the at least one resource is managed by the second server, which is located at a remote location over a communication network with respect to the first server;

communicating with the second server to retrieve the configuration view associated with the at least one resource;

forwarding the configuration view to the client;

maintaining, via the first server, configuration information associated with resources as specified by the first portion of the hierarchical tree, the second server maintaining configuration information associated with resources as specified by the second portion the hierarchical tree;

generating a configuration management view including a rendition of the hierarchical tree;

forwarding the configuration management view to the client for display of the hierarchical tree on a respective display screen at the client, the hierarchical tree enabling the client to select different configuration views associated with the storage area network;

wherein forwarding the configuration to the client view occurs in response to selection of the at least one resource in the hierarchical tree;

after forwarding the configuration view associated with the at least one resource to the client, receiving a command to modify the respective configuration information associated with the at least one resource;

in response to receiving the command, forwarding the command from the first server over the communication network to the second server;

after forwarding the command to the second server, receiving an updated configuration view associated with the at least one resource from the second server;

forwarding the updated configuration view from the first server to the client;

wherein the client is a first client of multiple clients, and wherein a second client of the multiple clients has direct access to the second server, the second client being restricted to viewing the second portion of the hierarchical tree and for viewing configuration information associated with resources in the second portion;

wherein the client is a first client of multiple clients, and wherein a second client of the multiple clients has direct access to the second server, the second client restricted to viewing the second portion of the hierarchical tree and for viewing configuration information associated with resources in the second portion of the hierarchical tree;

wherein the first server enables retrieval of configuration view information associated with storage area network resources managed by both the first server and the second server; and wherein the second server enables retrieval of configuration view information associated with storage area network resources managed only by the second server.

2. A computer-implemented method as in claim 1 further comprising:

forwarding a configuration management view to the client for display of the configuration management view on a respective display screen, the configuration management view enabling the client to select different configuration views associated with the storage area network; and wherein forwarding the configuration view to the client results in display of the configuration view in a region of the configuration management view at the client.

3. A computer-implemented method as in claim 1 further comprising:

after forwarding the configuration view to the client, receiving a command to modify the respective configuration information associated with the at least one resource; and in response to receiving the command, forwarding the command over the communication network to the second server;

after forwarding the command to the second server, receiving an updated configuration view associated with the at least one resource from the second server;

forwarding the updated configuration view to the client.

4. A computer-implemented method as in claim 1, wherein the hierarchical tree is a global hierarchical tree and maintaining the global hierarchical tree includes communicating with the second server to learn of a corresponding hierarchical tree of resources managed by the second server, the method further comprising:

integrating the corresponding hierarchical tree of resources managed by the second server with a hierarchical tree of resources managed by the first server to produce the global hierarchical tree.

5. A computer-implemented method as in claim 4 further comprising:

forwarding a configuration management view to the client for display of the configuration management view on a respective display screen at the client, the configuration management view including a rendition of the global hierarchical tree and, via use of the global hierarchical tree, the configuration management view enabling the client to select different configuration views associated with resources in the storage area network; and wherein forwarding the configuration view to the client results in display of the configuration view in a region of the configuration management view at the client.

6. A system for managing a storage area network, the system comprising:

an integrated server;

a remote server with respect to the integrated server;

the integrated server maintaining a global hierarchical tree of resources associated with the storage area network, a first portion of the hierarchical tree being used to keep track of storage area network resources managed by the integrated server, a second portion of the global hierarchical tree being used to keep track of storage area network resources managed by the remote server;

the integrated server configured to maintain configuration information associated with resources as specified by the first portion of the global hierarchical tree, the remote server configured to maintain configuration information associated with resources as specified by the second portion the global hierarchical tree;

the integrated server configured to:

communicate with the second server to learn of the second portion;

receive the second portion from the second server;

integrate the second portion with the first portion to produce the hierarchical tree;

generate a configuration management view including a rendition of the hierarchical tree;

forward, in response to selection of the at least one resource in the global hierarchical tree, the configuration management view to the client for display of the global hierarchical tree on a respective display screen at the client, the global hierarchical tree enabling the client to select different configuration views associated with the storage area network;

after forwarding the configuration view associated with the at least one resource to the client, receive a command to modify the respective configuration information associated with the at least one resource;

in response to receiving the command, forward the command from the integrated server over the communication network to the remote server;

after forwarding the command to the remote server, receive an updated configuration view associated with the at least one resource from the remote server;

forward the updated configuration view from the integrated server to the client;

wherein the client is a first client of multiple clients, and wherein a second client of the multiple clients has direct access to the remote server, the second client being restricted to viewing the second portion of the global hierarchical tree and for viewing configuration information associated with resources in the second portion;

wherein the client is a first client of multiple clients, and wherein a second client of the multiple clients has direct access to the remote server, the second client restricted to viewing the second portion of the global hierarchical tree and for viewing configuration information associated with resources in the second portion of the global hierarchical tree;

wherein the integrated server enables retrieval of configuration view information associated with storage area network resources managed by both the integrated server and the remote server; and wherein the remote server enables retrieval of configuration view information associated with storage area network resources managed only by the remote server.

7. A system as in claim 6, wherein the first portion of the global hierarchical tree is generated and maintained by the integrated server and the second portion of the global hierarchical tree is a plug-in hierarchical tree that is generated by the remote server, the integrated server integrating the plug-in hierarchical tree retrieved from the remote server with the first portion to create the global hierarchical tree.

8. A system as in claim 7, wherein the integrated server generates a management view including the global hierarchical tree for viewing by a respective client, the management view being used by the respective client to view and manage a configuration of the resources associated with the storage area network; and wherein the respective client initiates selection of a given resource from the global hierarchical tree in the management view, the selection by the respective client prompting the integrated server to identify that a respective configuration view associated with the given resource to be served to the respective client must be served from the remote server instead of the integrated server, the integrated server communicating with the remote server to retrieve the configuration view and forward the configuration view to the respective client.

9. A system as in claim 6, wherein the remote server is a host computer of a storage area network and an agent process on the host computer manages respective resources associated with the second portion of the global hierarchical tree, the agent process also generating the second portion as a plug-in hierarchical tree used by the integrated server to create the global hierarchical tree.

10. A system as in claim 6, wherein a respective client viewing the global hierarchical tree generates a request to the integrated server for a configuration view associated with a given resource in the global hierarchical tree, the given resource being managed by the remote server;

wherein the integrated server acts as a proxy for retrieving the configuration view from the remote server and forwarding the configuration view to the respective client; and wherein the respective client initiates a command to modify configuration information managed by the remote server via communications from the respective client through the integrated server to the remote server, the command prompting the remote server to update a corresponding hierarchical tree maintained by the remote server; and wherein the remote server notifies the integrated server of the changes to the corresponding hierarchical tree for purposes of updating the global hierarchical tree maintained by the integrated server.

11. A computer system comprising:

a processor;

a memory unit that stores instructions associated with an application executed by the processor; and an interconnect coupling the processor and the memory unit, enabling the computer system to execute the application and perform operations of:

receiving a request from a client for a configuration view associated with at least one resource in a storage area network;

identifying that respective configuration information associated with the at least one resource is managed by a remote server over a communication network;

communicating with the remote server to retrieve the configuration view associated with the at least one resource; and forwarding the configuration view to the client maintaining, via the first server, configuration information associated with resources as specified by the first portion of the hierarchical tree, the second server maintaining configuration information associated with resources as specified by the second portion the hierarchical tree;

maintaining the hierarchical tree associated with the storage area network including:

communicating with the second server to learn of the second portion;

receiving the second portion from the second server; and integrating the second portion with the first portion to produce the hierarchical tree;

generating a configuration management view including a rendition of the hierarchical tree;

forwarding the configuration management view to the client for display of the hierarchical tree on a respective display screen at the client, the hierarchical tree enabling the client to select different configuration views associated with the storage area network; and wherein forwarding the configuration to the client view occurs in response to selection of the at least one resource in the hierarchical tree;

after forwarding the configuration view associated with the at least one resource to the client, receiving a command to modify the respective configuration information associated with the at least one resource;

in response to receiving the command, forwarding the command from the first server over the communication network to the second server;

after forwarding the command to the second server, receiving an updated configuration view associated with the at least one resource from the second server;

forwarding the updated configuration view from the first server to the client;

wherein the client is a first client of multiple clients, and wherein a second client of the multiple clients has direct access to the second server, the second server being restricted to viewing the second portion of the hierarchical tree and for viewing configuration information associated with resources in the second portion;

wherein the client is a first client of multiple clients, and wherein a second client of the multiple clients has direct access to the second server, the second client restricted to viewing the second portion of the hierarchical tree and for viewing configuration information associated with resources in the second portion of the hierarchical tree;

wherein the first server enables retrieval of configuration view information associated with storage area network resources managed by both the first server and the second server; and wherein the second server enables retrieval of configuration view information associated with storage area network resources managed only by the second server.

12. A computer system as in claim 11 that additionally performs operations of:

maintaining a hierarchical tree associated with the storage area network, the hierarchical tree including a first portion for keeping track of storage area network resources managed by the first server, the hierarchical tree including a second portion for keeping track of storage area network resources managed by the second server.

13. A computer system as in claim 12, wherein the hierarchical tree is a global hierarchical tree and maintaining the global hierarchical tree includes communicating with the second server to learn of a corresponding hierarchical tree maintained by the second server, the computer system further supporting operations of:

integrating the corresponding hierarchical tree associated with the second server with a hierarchical tree of resources managed by the first server to produce the global hierarchical tree associated with the storage area network;

forwarding a configuration management view to the client for display on a respective display screen, the configuration management view including a rendition of the global hierarchical tree and, via use of the global hierarchical tree, the configuration management view enabling the client to select different configuration views associated with the storage area network; and wherein forwarding the configuration view to the client results in display of the configuration view in a region of the configuration management view at the client depending on a selection with respect to the global hierarchical tree.

14. A computer program product including a non-transitory, computer-readable storage medium having instructions stored thereon for processing data information, such that the instructions, when carried out by a processing device, enable the processing device to perform operations of:

receiving a request from a client for a configuration view associated with at least one resource in a storage area network;

identifying that respective configuration information associated with the at least one resource is managed by a remote server over a communication network;

communicating with the remote server to retrieve the configuration view associated with the at least one resource; and forwarding the configuration view to the client;

maintaining, via the first server, configuration information associated with resources as specified by the first portion of the hierarchical tree, the second server maintaining configuration information associated with resources as specified by the second portion the hierarchical tree;

generating a configuration management view including a rendition of the hierarchical tree;

forwarding the configuration management view to the client for display of the hierarchical tree on a respective display screen at the client, the hierarchical tree enabling the client to select different configuration views associated with the storage area network; and wherein forwarding the configuration to the client view occurs in response to selection of the at least one resource in the hierarchical tree;

after forwarding the configuration view associated with the at least one resource to the client, receiving a command to modify the respective configuration information associated with the at least one resource;

in response to receiving the command, forwarding the command from the first server over the communication network to the second server;

after forwarding the command to the second server, receiving an updated configuration view associated with the at least one resource from the second server;

forwarding the updated configuration view from the first server to the client;

wherein the client is a first client of multiple clients, and wherein a second client of the multiple clients has direct access to the second server, the second client being restricted to viewing the second portion of the hierarchical tree and for viewing configuration information associated with resources in the second portion;

wherein the client is a first client of multiple clients, and wherein a second client of the multiple clients has direct access to the second server, the second client restricted to viewing the second portion of the hierarchical tree and for viewing configuration information associated with resources in the second portion of the hierarchical tree;

wherein the first server enables retrieval of configuration view information associated with storage area network resources managed by both the first server and the second server;

wherein the second server enables retrieval of configuration view information associated with storage area network resources managed only by the second server; and wherein maintaining the hierarchical tree associated with the storage area network includes:

communicating with the second server to learn of the second portion;

receiving the second portion from the second server; and integrating the second portion with the first portion to produce the hierarchical tree.

15. The computer-implemented method as in claim 1, wherein the storage area network resources managed by the first server are remotely located with respect to the first server, the first server generating configuration views associated with resources referenced by the first portion of the hierarchical tree; and wherein the storage area network resources managed by the second server are remotely located with respect to the second server, the second server generating configuration views associated with resources referenced by the second portion of the hierarchical tree.

* * * * *